United States Patent Office.

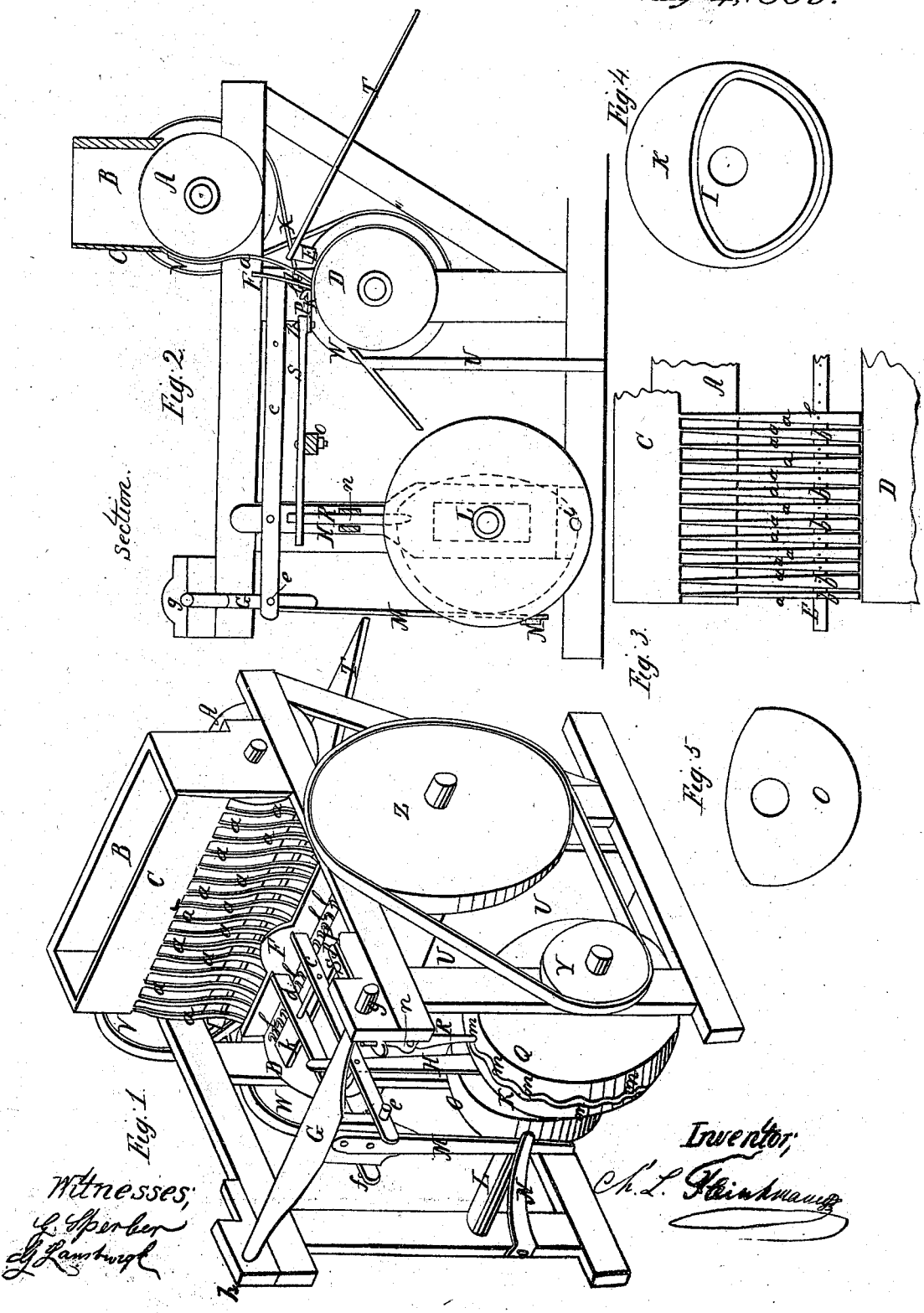

CHARLES LOUIS FLEISCHMANN, OF WASHINGTON, DISTRICT OF COLUMBIA.

*Letters Patent No. 89,751, dated May 4, 1869.*

IMPROVEMENT IN COTTON-GIN.

The Schedule referred to in these Letters Patent and making part of the same.

*To all whom it may concern:*

Be it known that I, CHARLES LOUIS FLEISCHMANN, in the county of Washington, city of Washington, District of Columbia, have invented a new and improved Cotton-Gin; and I do hereby declare that the following is a full and exact description thereof, reference being had to the accompanying drawings, and to the letters of reference marked thereon, of which—

Figure 1 is a perspective view of the cotton-gin.

Figure 2, a side view thereof, with the frame removed.

Figure 3 represents a part of the grate.

Figure 4, a side view of the cam which works the connecting-rod.

Figure 5, the cam which operates the oscillating block.

The nature of my invention consists in forcing the cotton-seeds between the spaces of grate-bars, in such a manner that the fibre remains inside of the grate, and the seeds outside, in order that they can be operated upon and held by a proper apparatus, while the stripper separates them from the fibre, whereby I am enabled to gin short as well as long-stapled cotton, without breaking or injuring the fibre.

To enable others skilled in the art to make and use my invention, I will proceed to describe its construction and operation.

A is the feeding-roller, over which is placed the hopper B.

In front of the roller A is placed the grate-plate C, to which is attached a number of vertical grate-bars, *a a a a a a*, &c.

The grate-bars are thin, very narrow on the top, and enlarge in width as they approach the base, in order to allow the seed to pass and project beyond the grate-bars, and, when the cotton is pushed down toward the base of the grate, that the cotton gets compressed between the narrow spaces of the bars. (See figs. 1, 2, and 3.)

The grate-bars are not straight, but follow partly the periphery of the feeding-roller A; and, below the axis of said roller, they curve inward.

The base of the bars almost touches the top of the roller D, in order to prevent the seed from passing between the grate and roller D.

The grate-bars are set very close to the feeding-roller A, so that the seeds are obliged to pass into the spaces between the bars.

To keep the bars steady, they are fastened to the cross-beam E, placed behind the grate, and below the roller A.

The bars are fastened, by bolts *b b b b*, &c., to the beam E, in such a manner that the fibre can easily pass down between the bars. (See figs. 2 and 3.)

To push the cotton down held between the bars, I use a broad, thin, metal plate, which I call the holder.

The holder F extends across the front of the grate.

The holder-plate is fastened to two arms, *c*, and *d* which swing freely on the pivots *e* and *f* of the oscillating block G.

The oscillating block turns in the sides of the frame, at *g* and *h*.

The holder F has two distinct movements, a vertical and a horizontal one.

The vertical motion is produced by means of a connecting-rod, H, which is secured on the top to the arms *c* and *d*, and below it has a knob, *i*, (see the dotted lines in fig. 2,) which fits the cam I, cut in the side of the disk K. (See fig. 4.)

This disk is placed on the axle L.

When the disk K turns, the cam I forces the connecting-rod to rise and descend, giving the required vertical movement to the holder.

The horizontal or oscillating motion is produced by the lever M, which is fastened to the block G, and pressed, by the spring N, against the cam O, (see fig. 5,) placed on the axle L, figs. 1 and 2.

The stripper P consists of a bar, *k*, from which projects a number of hooks, *l l l l l l*, &c., which take hold of the seeds, and, by their quick, short motion, separate them from the fibre.

The stripping-motion is produced by a continuous set of cams, *m m m m*, &c., cut in the periphery of the disks K and Q, which are placed on the axle L.

Between these cam-disks, the vibrating-rod R is suspended from its fulcrum, at *n*.

The upper end of the vibrating-rod R is secured in the horizontal lever S, which has its fulcrum at *o*, and is fastened to the stripper P by a bolt, *p*. (See figs. 1 and 2.)

Below the roller A is a partition, T, which prevents the dust or seed-cotton which may pass between the roller A and the grate to be mixed with the clean cotton.

The partition U separates the seeds from the clean fibre.

Operation.

The cotton to be ginned is placed in the hopper B. The roller A is set in motion by means of a band-wheel, gearing, or by hand. I, turns in the direction of the grate, and carries thus the cotton forward, and pushes the seeds into the spaces between the bars *a a a a a a*, and draws it down toward the base of the grate.

On one end of the roller A is placed a band-wheel, V, which is connected with the band-wheel W on the roller D by a cross-band, X, moving said roller in a contrary direction of roller A, keeping thus the cotton-seed continually close under the base of the grate-bars, and carrying the loose, clean fibre in the compartment below the partition T.

To push the cotton down between the bars, and to hold it tight while the stripper P separates the seed, are the functions of the holder F. To accomplish this, the holder has a horizontal, oscillating, and a vertical motion, already described above, viz: when it ascends, it is made to recede from the grate, to clear the seeds projecting from the bars; when it has reached its highest position, it moves forward close to the grate, to take hold of the seeds, and to carry them down in its descent, whereby the cotton-fibre is compressed in the narrow spaces of the grate; and when it reaches the top of roller D, the fibre is drawn under the grate, while the holder keeps the seeds very firm, for the stripper to take them off from the fibre. The stripper P strikes short blows, in rapid succession, by the mechanical arrangement described above. The loose fibre is carried, by the roller D, in the space beneath it, and the seeds fall in front of said roller.

The required rapidity of the moving parts is produced by the small band-wheel Y, placed on the axle L. (See fig. 1.)

This band-wheel is connected, by a band, with the large band-wheel Z, on the axle of the roller D.

What I claim as my invention, and desire to secure by Letters Patent, is—

1. The grate, in combination with the feeding-roller A, as above described.

2. The grate-bars *a a a*, &c., when constructed and arranged as described.

3. The roller D, in combination with the grate.

4. The holder F, when actuated by the devices shown, or equivalent means, for producing the vertical and horizontal motion herein described.

5. The stripper P, in combination with the roller D and holder F, substantially as herein described.

CHS. L. FLEISCHMANN.

Witnesses:
G. SPERBER,
G. LANSBROUGH.